(12) United States Patent
Hallock et al.

(10) Patent No.: US 10,712,526 B2
(45) Date of Patent: Jul. 14, 2020

(54) OPTICAL MOUNT WITH TILT ADJUSTMENT

(71) Applicant: Raytheon Company, Waltham, MA (US)

(72) Inventors: Grant Hallock, Santa Ana, CA (US); Andrew Truxel, Hermosa Beach, CA (US)

(73) Assignee: Raytheon Company, Waltham, MA (US)

( * ) Notice: Subject to any disclaimer, the term of this patent is extended or adjusted under 35 U.S.C. 154(b) by 161 days.

(21) Appl. No.: 15/842,047

(22) Filed: Dec. 14, 2017

(65) Prior Publication Data

US 2019/0187401 A1 Jun. 20, 2019

(51) Int. Cl.
*G02B 7/02* (2006.01)
*G02B 7/00* (2006.01)
(Continued)

(52) U.S. Cl.
CPC .............. *G02B 7/023* (2013.01); *B33Y 10/00* (2014.12); *B33Y 80/00* (2014.12); *F16M 11/12* (2013.01);
(Continued)

(58) Field of Classification Search
CPC . G02B 7/023; G02B 7/08; G02B 7/04; G02B 7/102; G02B 7/026; G02B 27/646; G02B 7/02; G02B 7/021; G02B 13/001; G02B 7/003; G02B 7/004; G02B 7/005; G02B 26/0875; G02B 7/022;
(Continued)

(56) References Cited

U.S. PATENT DOCUMENTS 5,801,891 A 9/1998 Lloyd
5,986,827 A 11/1999 Hale
(Continued)

FOREIGN PATENT DOCUMENTS

DE 32 17 298 A1 11/1983
DE 10 2016 004 742 A1 10/2017
JP H10-206713 A 8/1998

OTHER PUBLICATIONS

International Search Report and Written Opinion for corresponding International Application No. PCT/US2018/043807 dated Oct. 15, 2018.

*Primary Examiner* — Thomas K Pham
*Assistant Examiner* — Sharrief I Broome
(74) *Attorney, Agent, or Firm* — Renner, Otto, Bossielle & Sklar, LLP

(57) ABSTRACT

An optical device mount is made largely as a single unitary, continuous, and monolithic piece of material. The single-material piece for optical mount includes a frame, a pair of overlapping plates that secure an optical device (an optic) such as a lens or mirror, and flexures that couple the plates to each other and to the frame, so as to allow tilt of the optical device relative to the frame in multiple directions. The optical device mount may include tilt adjustment mechanisms for adjusting the tilt in the multiple directions, for example by putting forces on the plates and/or frame that cause flexing at the flexures, thereby tilting the optical device. The material for the single piece of the optical mount may be any of a variety of suitable materials, such as metals, polymers, or other suitable materials.

22 Claims, 4 Drawing Sheets

(51) Int. Cl.
*B33Y 80/00* (2015.01)
*B33Y 10/00* (2015.01)
*F16M 11/12* (2006.01)
*F16M 13/02* (2006.01)
*G02B 7/182* (2006.01)

(52) U.S. Cl.
CPC .............. *F16M 13/02* (2013.01); *G02B 7/004* (2013.01); *G02B 7/025* (2013.01); *G02B 7/182* (2013.01); *G02B 7/1825* (2013.01)

(58) Field of Classification Search
CPC ...... G02B 27/0068; G02B 7/09; G02B 13/14; G02B 15/14; G02B 23/2423; G02B 26/0858; G03B 3/10; G03B 5/00; G03B 2205/0046; G03B 17/00; G03B 17/14; G03B 21/142; G03B 13/34; G03B 13/36; G03B 17/02; G03B 2205/0007; G03B 2205/0015; G03B 2205/0053; G03B 2205/0069; G03B 13/00; G03B 17/563; G03B 17/565; G03B 2205/0061; G03B 2205/0084; G03B 27/32; G03B 27/42
See application file for complete search history.

(56) References Cited

U.S. PATENT DOCUMENTS

| | | |
|---|---|---|
| 8,792,191 B2 | 7/2014 | Hopkins et al. |
| 2003/0035229 A1* | 2/2003 | Willis .................... G02B 7/004 359/819 |
| 2013/0242419 A1* | 9/2013 | Hopkins .............. G02B 7/1825 359/819 |
| 2015/0056415 A1* | 2/2015 | Southard .................. G02B 5/10 428/161 |
| 2016/0231530 A1* | 8/2016 | Liermann ............... G02B 7/023 |
| 2018/0233873 A1 | 8/2018 | Chen et al. |
| 2019/0072113 A1* | 3/2019 | Lin ....................... F04D 29/601 |

* cited by examiner

OPTICAL MOUNT WITH TILT ADJUSTMENT

FIELD OF THE INVENTION

This disclosure relates generally to the field of optical mounts for mounting optical devices (optics).

DESCRIPTION OF THE RELATED ART

Optical mounts, for supporting optics such as lenses, beam splitters, mirrors, and the like, have many potential shortcomings. Some mounts may have complicated adjustment mechanisms for positioning optics. Sometimes it may be difficult to use off-the-shelf mounts in a system, which may lead to a need to design and configure a custom mount. Such mounts may have long lead times to configure from scratch, to design, procure, and fabricate a mount. It would be desirable to have better mounts, and ones that could more easily be configured and fabricated, with less lead time.

SUMMARY OF THE INVENTION

An optical mount is additively manufactured, including a flexures that allow tilt adjustment between parts of the mount.

An optical mount includes a pair of overlapping plates, one of which has an optic mounted to it, and flexures mechanically coupling the plates together, and mechanically coupling one of the plates to a frame of the mount, thereby allowing tilt adjustment of the optic.

According to an aspect of the invention, an optical device mount includes: a frame; a pair of overlapping plates, at least one of which is configured to receive an optic; a first flexure between the frame and a first plate of the pair of plates; and a second flexure between the first plate, and a second plate of the pair of plates. The frame, the flexures, and the plates are all parts of a single unitary continuous monolithic piece of material.

According to an embodiment of any paragraph(s) of this summary, the flexures allow flexing of the plates in different directions relative to the frame.

According to an embodiment of any paragraph(s) of this summary, the different directions are orthogonal.

According to an embodiment of any paragraph(s) of this summary, the different directions are non-orthogonal.

According to an embodiment of any paragraph(s) of this summary, the flexures extend along edges of the mounting plates.

According to an embodiment of any paragraph(s) of this summary, the flexures are thinner than the mounting plates.

According to an embodiment of any paragraph(s) of this summary, the flexures each have a curved shape.

According to an embodiment of any paragraph(s) of this summary, the optical device mount further includes a first clamp that enables adjustment of a tilt angle between the first plate and the frame.

According to an embodiment of any paragraph(s) of this summary, the optical device mount further includes a second clamp that enables adjustment of a tilt angle between the first plate and the second plate.

According to an embodiment of any paragraph(s) of this summary, the flexures enable control of tilting of the plates relative to the frame, in multiple directions.

According to an embodiment of any paragraph(s) of this summary, the single piece of material is additively manufactured.

According to another aspect of the invention, an optical system includes: an optical device mount that includes: a frame; a pair of overlapping plates; a first flexure between the frame and a first plate of the pair of plates; and a second flexure between the first plate, and a second plate of the pair of plates; and an optic secured to the second plate. The frame, the flexures, and the plates are all parts of a single unitary continuous monolithic piece of material According to an embodiment of any paragraph(s) of this summary, the optic is a lens.

According to an embodiment of any paragraph(s) of this summary, the optic is a mirror.

According to an embodiment of any paragraph(s) of this summary, the optic is a beam splitter.

According to an embodiment of any paragraph(s) of this summary, the optic is adhesively secured to the second plate.

According to a further aspect of the invention, a method of adjusting an optic mounted in an optical mount, includes the steps of: adjusting a first tilt angle between a frame of the mount and a first plate of the mount, wherein the adjusting the first tilt angle includes flexing a first flexure linking the frame and the first plate; and adjusting a second tilt angle between the first plane and a second plate of the mount, wherein the adjusting the second tilt angle includes flexing a second flexure linking the first plate and the second plate. The frame, the first and second plates, and the first and second flexures are all parts of a single unitary continuous monolithic piece of material.

According to a still further aspect of the invention, a method of making an optical mount, the method including the steps of: additively manufacturing, as a single piece: a frame; a pair of overlapping optical device mounting plates for receiving and securing an optical device; a first flexure between the frame and a first plate of the pair of optical device mounting plates; and a second flexure between the first plate, and a second plate of the pair of optical device mounting plates. The additively manufacturing includes manufacturing the parts of the single piece with different thicknesses, the frame being thicker than the plates, and the plates.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

Figure 1:
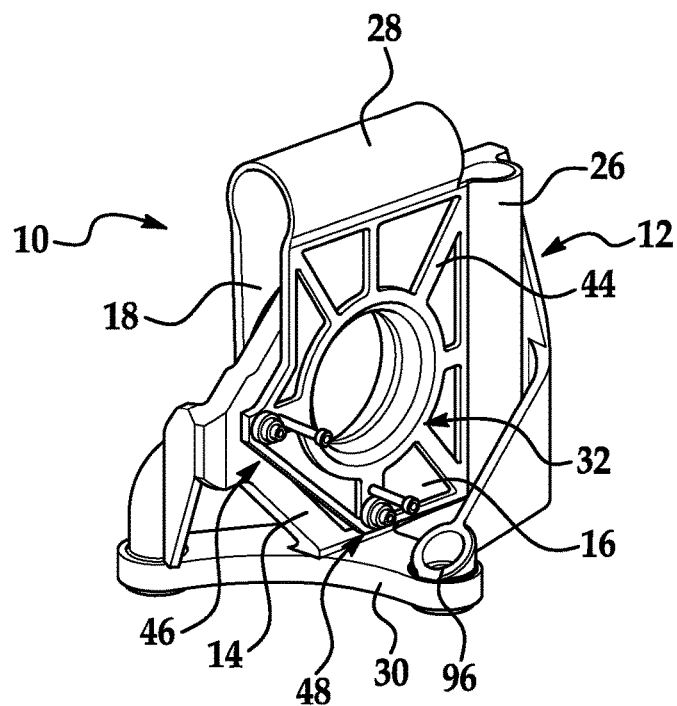
FIG. 1 is an oblique view of an optical mount in accordance with an embodiment of the present invention.
Figure 2:
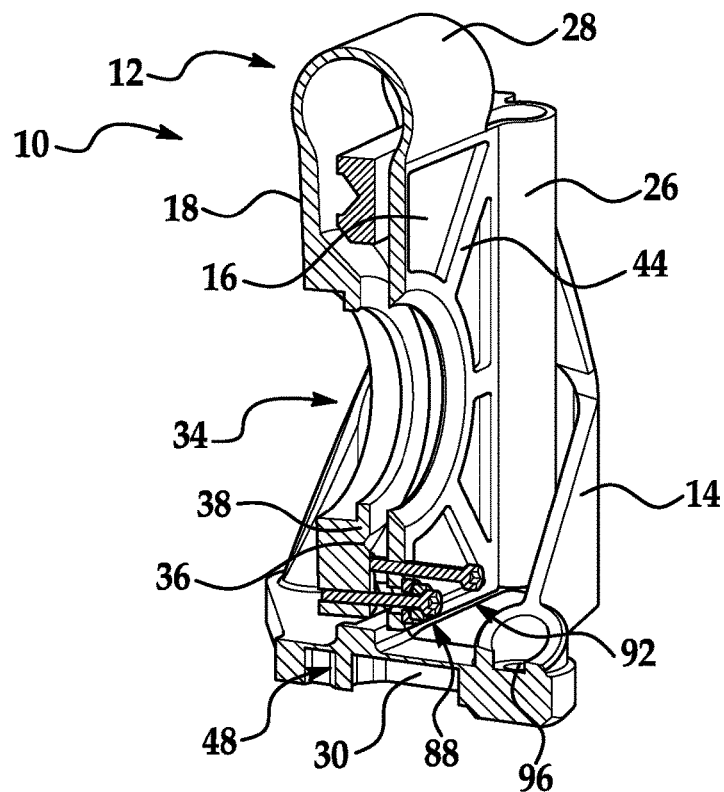
FIG. 2 is a cutaway view of the optical mount of FIG. 1.
Figure 3:
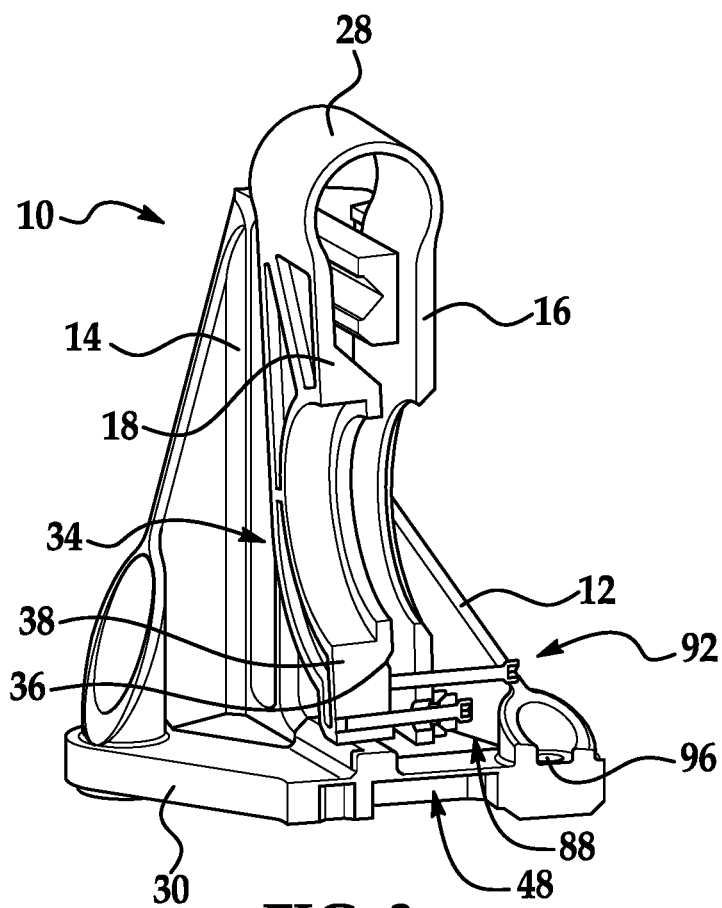
FIG. 3 is another cutaway view of the optical mount of FIG. 1.
Figure 4:
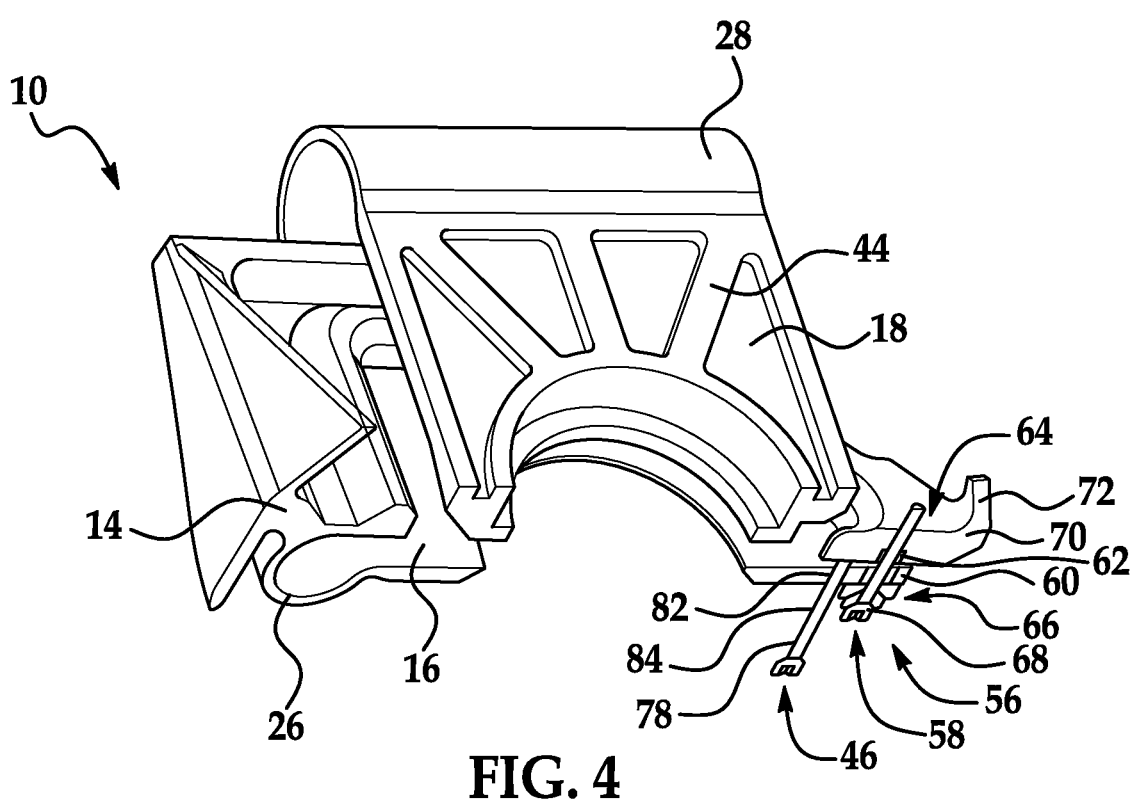
FIG. 4 is still another cutaway view of the optical mount of FIG. 1.

An optical device mount is made largely as a single unitary, continuous, and monolithic piece of material. The single-material piece for optical mount includes a frame, a pair of overlapping plates that secure an optical device (an optic) such as a lens or mirror, and flexures that couple the plates to each other and to the frame, so as to allow tilt of the optical device relative to the frame in multiple directions. The optical device mount may include tilt adjustment mechanisms for adjusting the tilt in the multiple directions, for example by putting forces on the plates and/or frame that cause flexing at the flexures, thereby tilting the optical device. The material for the single piece of the optical mount may be any of a variety of suitable materials, such as metals, polymers, or other suitable materials.

FIGS. 1-4 show an optical device mount 10 which for the most part is made of a single continuous piece of material 12, produced for example by an additive manufacturing process. The mount 10 includes a frame 14 and a pair of overlapping plates 16 and 18, one of which receives an optic or optical device (not shown), such as a lens, mirror, or beam splitter. The mount 10 also includes a pair of flexures 26 and 28, which are also part of the single piece of material 12. The first flexure 26 hingedly couples the first plate 16 to the frame 14. The second flexure 28 hingedly couples the second plate 18 to the first plate 16. The flexures 26 and 28 enable the plates 16 and 18 to be tilted relative to the frame 14, such as in elevation and azimuth, to allow the orientation of the optical device to be adjusted for proper alignment with other parts (not shown) of an optical system. The frame 14 may include a base 30 that enables the mount 10 to be coupled to an optical table or other structure (not shown).

The plates 16 and 18 overlap one another such that respective central openings 32 and 34 in the plates 16 and 18 are aligned. The optical device (optic) is placed at the central opening 34 of the plate 18, engaging a notch 36 in a ridge 38 around the central opening 34. A suitable optical-grade adhesive, for example a suitable elastomeric adhesive or epoxy adhesive, may be used to hold the optic in place. This allows the optical device to receive light and (for optical devices such as lenses and beam splitters) pass light through.

The plates 16 and 18 may be configured to have material only where needed to maintain structural strength. Thus the plates 16 and 18 may have ribs such as integral ribs 44, with other parts of the plates 16 and 18 thinner than where the ribs 44 are located.

In the illustrated embodiments the plates 16 and 18 are rectangular. Alternatively the plates 16 and 18 may have any of a variety of other suitable shapes. The plates 16 and 18 in the illustrated embodiment are planar, but the plates 16 and 18 alternatively may be non-planar, or may have parts that are not planar.

The flexures 26 and 28 are thinner than the plates 16 and 18, such that there is bending preferably at the flexures 26 and 28 when force(s) are applied to major surface(s) of one or both of the plates 16 and 18. The flexures 26 and 28 are located at edges of the plates 16 and 18, with the flexures 26 and 28 at perpendicular edges of the plates 16 and 18 in the illustrated embodiment. This allows tilting on the plates 16 and 18 in a pair of orthogonal directions, allowing a full range of tilt adjustment for the optical device. In particular it is the plate 18, to which the optic is attached, that has its tilt controlled. More broadly, the flexures 26 and 28 may facilitate tilting in different directions that are not necessarily orthogonal. In addition the flexures 26 and 28 may be located at other than the edges of the plates 16 and 18, although locating the flexures 26 and 28 at the plate edges facilitates the tilting, which is described further below.

The frame 14 is thicker and stronger than the plates 16 and 18, and is configured to be rigid relative to other parts of the single piece 12 that makes up most of the mount 10 (such as the plates 16 and 18). The frame 14 may have any of a variety of suitable structural features, such as struts or other supports, which enhance the rigidity of the frame 14 and/or provide a secure and rigid attachment or connection between the frame 14 and the base 30.

Besides attachment through the flexures 26 and 28, the various parts of the single piece 12 are attached at a pair of points by clamps 46 and 48. The clamps 46 and 48 are on opposite sides of the overlapped plates 16 and 18 from the respective flexures 26 and 28. The clamps 46 and 48 serve to adjust tilt of the plates 16 and 18 (and the optical device) relative to the frame 14. The clamp 46 is used to secure the plate 16 to the frame 14. The clamp 48 is used to secure the plate 18 to the plate 16.

The clamps 46 and 48 each involve a pair of threaded connections, one to provide a force or limit pushing the clamped pieces apart, and the other to provide a limit to the separation between the clamped pieces. The pair of threaded connections for each of the clamps 46 and 48 operate in a push-pull fashion fixing the connection of the two parts clamped together in such a way as to maintain the connection even through temperature changes. The clamp 46 has a threaded securement 56 in which a bolt or screw (a threaded fastener) 58 passes through a hole 60 in the plate 16 and engages an internally-threaded insert 62 in a hole 64 in the frame 14. The threaded fastener 58 passes through a washer set 66 that is between the plate 16 and a head 68 of the threaded fastener 58. A cupped or curved surface between the washer parts 70 and 72 of the washer set 66 allows for tilting of the plate 16 relative to the frame 14. The threaded fastener 58 is thus used to secure the plate 16 to the frame 14, limiting the separation between the plate 16 and the frame 14.

A threaded separator 78 is also used in adjusting the azimuthal tilt angle between the plate 16 and the frame 14, maintaining separation between the plate 16 and the frame 14. The separator 78 (a threaded fastener such as a bolt or a screw) threadedly engages an internally-threaded insert 82 in a hole 84 in the plate 16. The tip of the shaft of the separator 78 bears against the frame 14, such that the turning the separator 78 moves the plate 16 (the portion of the plate 16 where the insert 82 is located) to change the tilt angle of the plate 16 relative to the frame 14.

The clamp 48 involves a similar pair of threaded connections for controlling the tilt angle of the plate 18 relative to the plate 16, and relative to the frame 14. The clamp 48 includes a threaded fastener 88 to lock the plates 16 and 18 together, and a separator 92 to adjust the tilt angle between the frame 14 and the plates 16 and 18, by placement of a torque on the plates 16 and 18 at the location of the separator 92.

The clamps 46 and 48 are configured to adjust tilt in different directions, such as in different orthogonal directions, for example to provide azimuth and elevation adjustment. Toward that end, the clamps 46 and 48 are located at different locations, with the clamp 46 at a side of the mount 10 (directly to one side of the central openings 32 and 34), and the clamp 48 at the bottom of the mount 10 (directly below the central openings 32 and 34). Providing adjustment in orthogonal directions, such as azimuth and elevation, has the advantage that the adjustment mechanisms provide independent adjustment for their respective directions.

Nonetheless alternatively the clamps 46 and 48 may be located on the mount 10 so as to provide non-orthogonal tilt adjustment. For example an alternative optical mount may have clamps and configured to enable tilt adjustment in directions 1-179 degrees offset from one another. Such non-orthogonal adjustment may be advantageous for adjusting the position of certain types of optics, such as non-orthogonal beam splitters, or laser crystals or other optics that have an inherent odd (non-perpendicular) angle of polarization, clocked to a non-right angle. Examples of such angles include 30 degrees offset, 60 degrees offset, or 120 degrees offset, or other suitable non-orthogonal arrangements.

Referring again to FIGS. 1-4, the base 30 has holes 96 therein. The holes 96 may be used to mechanically couple the mount 10 to an optical table or other suitable device that is used to fix the location of various optical elements of an optical system.

Much of the mount 10 may be made in an additive manufacturing process. For example the single continuous piece 12 may be made by an additive manufacturing process, with items such as the inserts 62 and 82 pre-placed, with the additive material of the piece 12 built around them. Any suitable additive manufacturing technique may be employed according to well-known methods. For example, such additive manufacturing methods may include: vat photopolymerization techniques (e.g., stereolithography (SLA), direct light processing (DLP), continuous liquid interface production (CLIP)); powderbed fusion techniques (e.g., selective layer sintering (SLS), selective laser melting (SLM/DMLS), electron beam melting (EBM), multijet fusion (MJF)); material extrusion techniques (e.g., fused deposition modeling (FDM)); material jetting techniques; binder jetting techniques; direct energy deposition techniques (e.g., laser engineered net shape (LENS), electron beam additive manufacturing (EBAM); or any other suitable techniques (e.g., ultrasonic additive manufacturing, etc.).

Any of a variety of suitable materials may be used for the single piece 12. Examples of suitable materials include stainless steel, aluminum, titanium, alloys such as nickel-iron alloys, polymers, or combinations of materials. Other materials are or may be possible, such as metal alloys with high specific stiffness and low stress crack propagation properties.

The single piece 12 may have the same composition throughout. The material composition may be selected in order to have advantageous properties in terms of response to temperature changes. For example making the entire single piece 12 of the same material means that all of the piece 12 responds similarly to changes in temperature, with a uniform (or nearly uniform) coefficient of thermal expansion throughout the single piece 12. In addition the material may be selected so as to correspond to thermal expansion characteristics of the optical device (optic) held by the mount 10, which helps in maintaining proper positioning of the optical device or element as temperature changes, and reduces (or eliminates) thermal stresses on the optical element from temperature changes, due to mismatched thermal expansion coefficients.

Alternatively different parts of the piece 12 may have different material compositions. For example there may be a different composition of materials in contact with the optic than in other parts of the single material piece 12. One possibility is to vary the stiffness of the material in a single additively-manufactured object, with for example soft rubber printed on the same part with hard plastic. This would be beneficial to do at the flexure locations, and may result in a smaller part. Areas that need to be stiff could be made of a relatively stiff material and possibly thinner, and flexures could be made of a less stiff (relatively flexible) material.

Many variations are possible for the configuration of optical mounts. The various parts may have shapes, thicknesses, adjustment mechanisms, or other features different from the illustrated embodiment. Among the features that an optical mount could have are an athermal bonded mount, an athermal kinematic mount, a three-point kinematic mount, a retainer mount, a clamped o-ring mount, or a rotational flexure mount.

Figure 5:
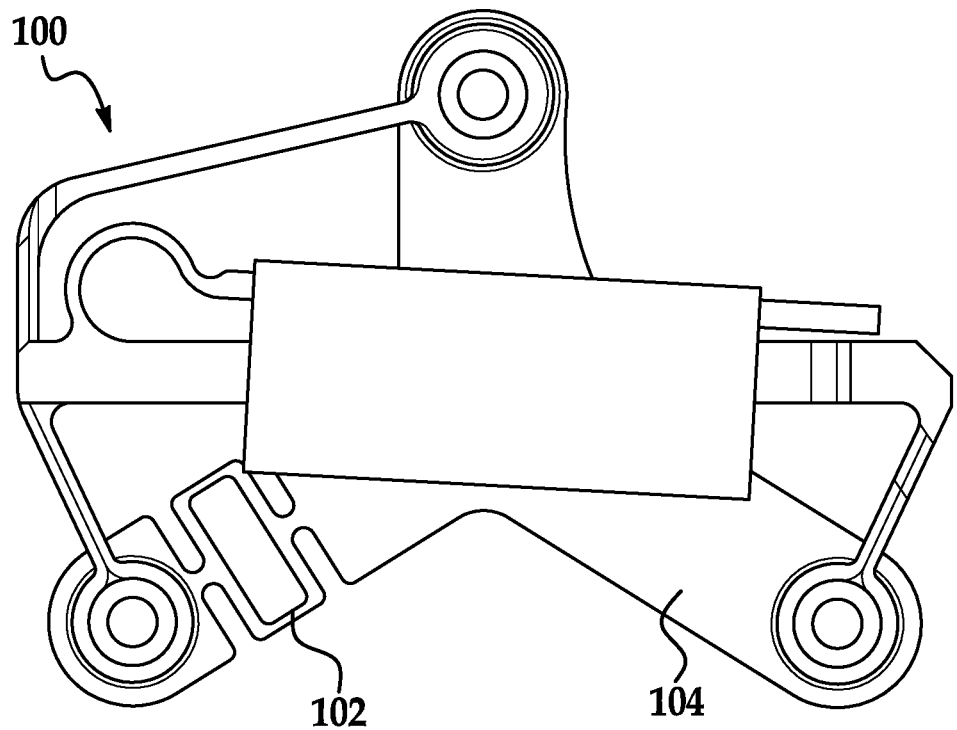
FIG. 5 is a plan view of an alternate embodiment optical mount in accordance with an alternate embodiment of the present invention.

FIG. 5 shows an example of such a mount, a mount 100 that has a flexure 102 that is part of a base 104. The flexure 102 may allow translation of one leg of the base 104 relative to other legs of the base 104. The flexure 102 may be configured to compensate for mismatch between the base 104 and a device to which the mount 100 is mechanically coupled. For example the flexure 102 may be used to compensate for thermal mismatch when materials with different coefficients of thermal expansion are used, such as for the mount 100 being made of plastic being secured to an optical platform or bench being made of a non-plastic material, such as aluminum.

Further, by selecting a proper combination of plate thickness and optic thickness a 180-degree field of view can be achieved at entrance and exit of the mount. Overall mount size/volume can be optimized based on the requirements of the application. For example less harsh environments do not need as robust flexures as harsh environments, and thus an application of this mount in a less harsh environment can have a reduced amount of material. Another possibility would be off-axis placement of an optic, to give significant translation along the optical axis, which could be of use in more exotic laser/optical crystal materials.

The mounting interface between the mount and optical bench/main assembly can have flexures integrated into the mount itself to help mitigate any miss-matched coefficient thermal expansion between them. The same principles applied to athermal or thermally isolated optic mounts can be applied to this particular interface in the event an application is needed in which similar materials are not possible or practical.

Figure 6:
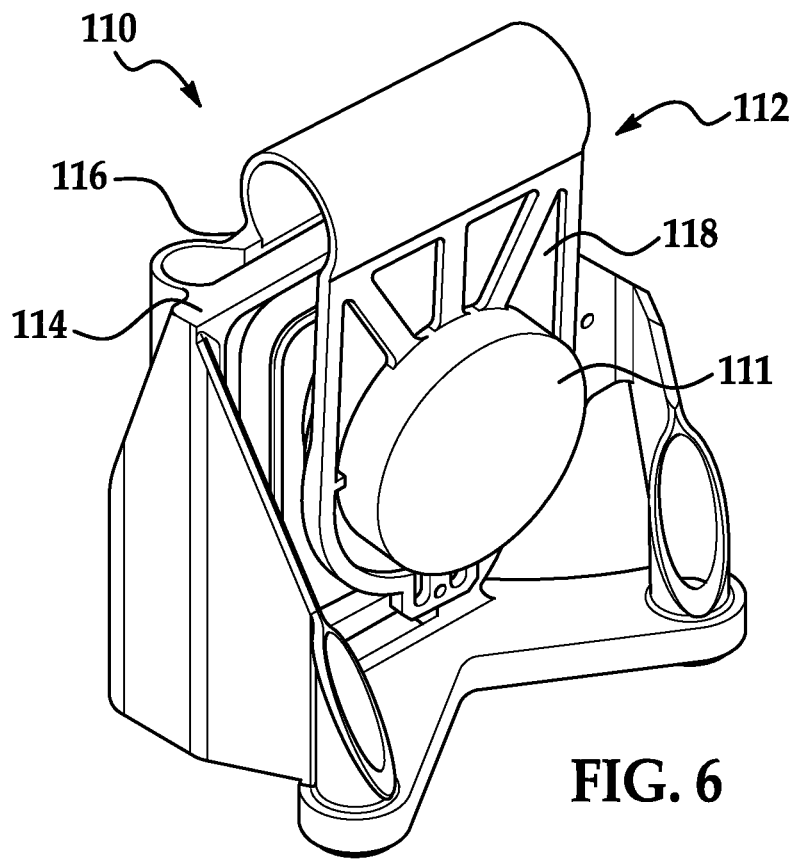
FIG. 6 is an oblique view of an optical mount in accordance with yet another embodiment of the present invention.

FIG. 6 shows an alternative mount 110, in which an optic 111 is integrated in a single piece 112 that includes a frame 114 and plates 116 and 118 that are tiltable relative to the frame 114. The optical device (optic) 111 (mirror, lens, or beam splitter, for example) may be manufactured separately and held in place as the single piece 112 (in particular the plate 118 is formed around the optic).

Figure 7:
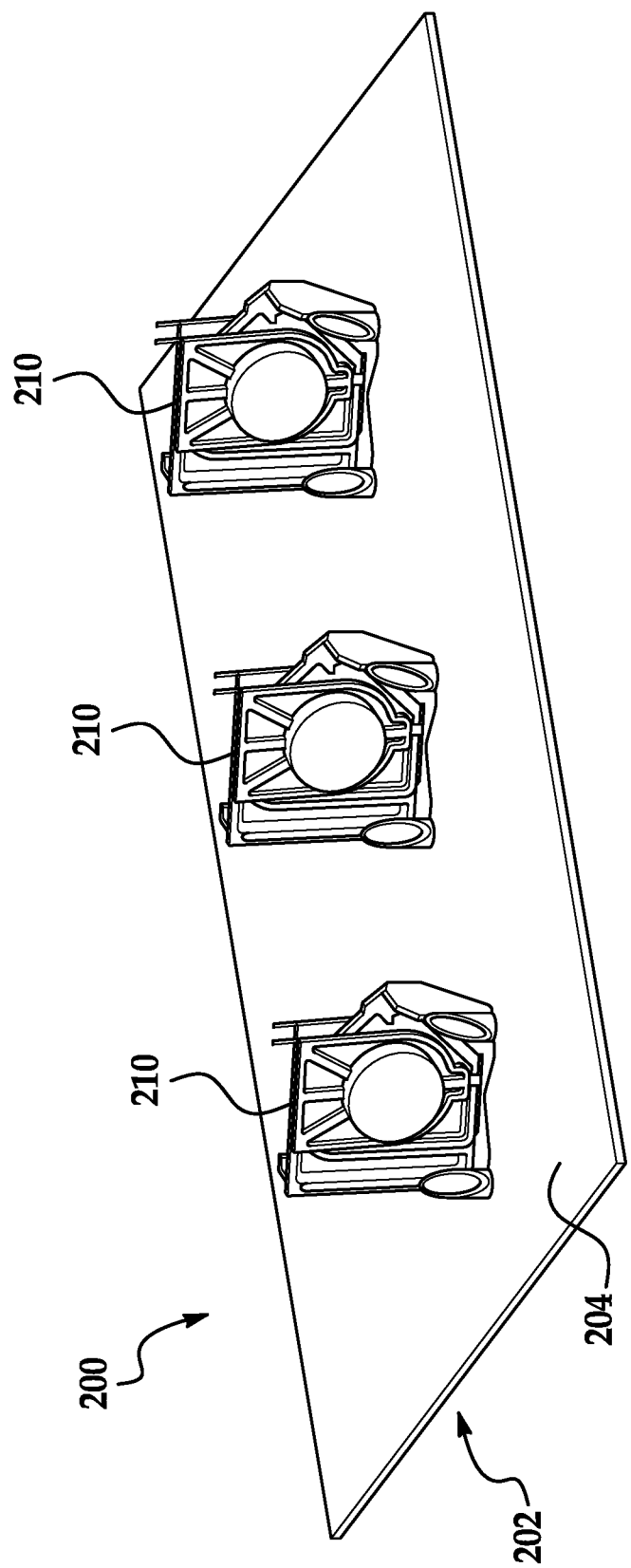
FIG. 7 is an oblique view of an optical system, in accordance with still another embodiment of the present invention.

FIG. 7 shows another alternative, an optical system 200 which has a single piece 202 that includes an optical platform or bench 204 formed as an integral piece with a series of optical mounts 210 that are used to mount different optical components (optics) 212. The mounts 210 may each be similar to the mount 10 (FIG. 1) or the mount 110 (FIG. 6) described above. The single piece 202 may be formed using a suitable additive manufacturing process. By forming multiple of the optical mounts together as parts of the single piece 202, the entire supporting structure of the system 200 may be made more resistant to varying thermal expansion, and setting up and adjusting the various mounts 210 may be simplified.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An optical device mount comprising:
    a frame;
    a pair of overlapping plates, at least one of which is configured to receive an optic;
    a first flexure directly connected to the frame and a first plate of the pair of plates; and
    a second flexure directly connected to the first plate, and a second plate of the pair of plates;
    wherein the frame, the flexures, and the plates are all parts of a single unitary continuous monolithic piece of material;
    wherein the frame is between and at least partially overlapped by the plates; and
    wherein the flexures are thinner than the mounting plates.

2. The optical device mount of claim 1, wherein the flexures allow flexing of the plates in different directions relative to the frame.

3. The optical device mount of claim 2, wherein the different directions are orthogonal.

4. The optical device mount of claim 2, wherein the different directions are non-orthogonal.

5. The optical device mount of claim 1, wherein the flexures extend along edges of the mounting plates.

6. The optical device mount of claim 1, wherein the flexures each have a curved shape.

7. An optical device mount comprising:
    a frame;
    a pair of overlapping plates, at least one of which is configured to receive an optic;
    a first flexure between the frame and a first plate of the pair of plates;
    a second flexure between the first plate, and a second plate of the pair of plates; and
    a first clamp that enables adjustment of a tilt angle between the first plate and the frame;
    wherein the frame, the flexures, and the plates are all parts of a single unitary continuous monolithic piece of material; and
    wherein the first clamp includes a pair of fasteners that operate in a push-pull connection.

8. The optical device mount of claim 7, wherein the pair of fasteners are threaded fasteners.

9. The optical device mount of claim 1, wherein the flexures enable control of tilting of the plates relative to the frame, in multiple directions.

10. The optical device mount of claim 1, wherein the single piece of material is additively manufactured.

11. An optical system comprising:
    an optical device mount according to claim 1; and
    an optic secured to the second plate.

12. The system of claim 11, wherein the optic is a lens, a mirror, or a beam splitter.

13. The system of claim 11, wherein the optic is adhesively secured to the second plate.

14. The optical device mount of claim 1, wherein the frame is thicker and stronger than the plates.

15. The optical device mount of claim 1, wherein the frame includes a base for mounting the optical device mount to another structure.

16. The optical device mount of claim 15, wherein the base has feet, and at least one of the feet includes a flexure.

17. The optical device mount of claim 8, further comprising a second clamp that enables adjustment of a tilt angle between the first plate and the second plate.

18. The optical device of claim 8, wherein the threaded fasteners are substantially parallel to one another.

19. The optical device of claim 8, wherein one of the threaded fasteners passes through a washer set between a head of the one of the fasteners, and the first plate.

20. The optical device of claim 19, wherein the washer set includes a pair of washer parts with a curved surface therebetween.

21. The optical device mount of claim 17, wherein the second clamp includes an additional pair of threaded fasteners that are substantially parallel to one another.

22. The optical device mount of claim 21,
    wherein one of the additional threaded fasteners passes through an additional washer set between a head of the one of the additional fasteners, and the second plate; and
    wherein the additional washer set includes a pair of washer parts with a curved surface therebetween.

* * * * *